United States Patent
Sin et al.

(10) Patent No.: US 12,392,450 B2
(45) Date of Patent: Aug. 19, 2025

(54) APPARATUS FOR A DISPLAY DEVICE

(71) Applicant: SECRETLAB SG PTE. LTD., Singapore (SG)

(72) Inventors: Vincent Sin, Singapore (SG); Ee Hao Gabriel Lim, Singapore (SG)

(73) Assignee: Secretlab SG Pte. Ltd., Singapore (SG)

(*) Notice: Subject to any disclaimer, the term of this patent is extended or adjusted under 35 U.S.C. 154(b) by 0 days.

(21) Appl. No.: 18/331,210

(22) Filed: Jun. 8, 2023

(65) Prior Publication Data
US 2023/0400146 A1 Dec. 14, 2023

(30) Foreign Application Priority Data
Jun. 9, 2022 (SG) .............................. 10202250118P

(51) Int. Cl.
*F16M 13/02* (2006.01)
*F16M 11/10* (2006.01)
(Continued)

(52) U.S. Cl.
CPC .......... *F16M 13/022* (2013.01); *F16M 11/10* (2013.01); *F16M 11/125* (2013.01);
(Continued)

(58) Field of Classification Search
CPC .... F16M 13/022; F16M 11/10; F16M 11/125; F16M 11/2064; F16M 11/38; F16M 2200/068; F16M 11/041
See application file for complete search history.

(56) References Cited

U.S. PATENT DOCUMENTS 8,469,323 B1 * 6/2013 Deros ................. F16M 11/105
248/124.2
9,257,218 B2 * 2/2016 Gibbs .................. H01F 7/0252
(Continued)

FOREIGN PATENT DOCUMENTS

GB 2558935 A * 7/2018 ............. A47B 97/00
WO WO-2015057184 A1 * 4/2015 ............. F16M 11/14

OTHER PUBLICATIONS

Wali single monitor gas spring desk mount (model No. GSM001XL) sold on amazon dated Dec. 20, 2018, https://www.amazon.com/WALI-Monitor-Adjustable-Capacity-GSM001XL/dp/B07NLMLLT6 (Year: 2018).*
(Continued)

*Primary Examiner* — Terrell L McKinnon
*Assistant Examiner* — Ding Y Tan
(74) *Attorney, Agent, or Firm* — Viering, Jentschura & Partner mbB

(57) ABSTRACT

Disclosed is an apparatus for a display device including a fastening assembly mountable to a surface; an adjustment portion having an end configured to receive a display device mount, and an opposing end configured for attachment to the fastening assembly; the adjustment portion comprising at least one hollow portion formed of or from a metallic material for receiving an accessory, and a sheath formed of or from a magnetic material for magnetic coupling with the at least one hollow portion, wherein the sheath is moveable along a longitudinal axis of the adjustment portion. The disclosure further includes a kit of parts of an apparatus for a display device, and a method of manufacturing an apparatus for a display device.

20 Claims, 9 Drawing Sheets

(51) Int. Cl.
*F16M 11/12* (2006.01)
*F16M 11/20* (2006.01)
*F16M 11/38* (2006.01)

(52) U.S. Cl.
CPC ......... *F16M 11/2064* (2013.01); *F16M 11/38* (2013.01); *F16M 2200/068* (2013.01)

(56) References Cited

U.S. PATENT DOCUMENTS

| | | | |
|---|---|---|---|
| 10,550,996 B1* | 2/2020 | Chen | F16M 13/022 |
| 11,846,385 B2* | 12/2023 | Fei | F16M 11/24 |
| 2008/0029663 A1* | 2/2008 | Derry | F16M 11/10 |
| | | | 248/178.1 |
| 2010/0059648 A1* | 3/2010 | Zhang | F16M 11/2021 |
| | | | 248/371 |
| 2014/0367137 A1* | 12/2014 | Leung | F16M 11/2014 |
| | | | 174/68.3 |
| 2016/0312952 A1* | 10/2016 | Kalis | E05D 7/009 |
| 2018/0137789 A1* | 5/2018 | Murray, III | H01F 7/0257 |
| 2019/0235584 A1* | 8/2019 | Tenno | G06F 1/1683 |
| 2019/0301670 A1* | 10/2019 | Glickstein | F16M 11/26 |
| 2021/0173491 A1* | 6/2021 | Columbus | G06F 3/016 |
| 2022/0082206 A1 | 3/2022 | Walker et al. | |
| 2023/0065758 A1* | 3/2023 | Kwon | F16M 11/2014 |

OTHER PUBLICATIONS

Secretlab Magnus metal desk demo guide youtube video dated Apr. 27, 2021, https://www.youtube.com/watch?v=Cn8-07Kz3mk (Year: 2021).*
BTODtv "5 tips that will fix your cable management" youtube video dated Jun. 2, 2022, https://www.youtube.com/watch?v=RrRncz5DQOo (Year: 2022).*
Secretlab magnetic cable sheath for Magus online product page (https://secretlab.co/products/magnetic-cable-sheath) earliest archive. org dated at May 22, 2022 (Year: 2022).*
Lumi youtube video dated Nov. 3, 2020 "Factory Tour—Monitor Mounts Factory [LUMI]" (https://www.youtube.com/watch?v=pfQZ7rOoUPQ (Year: 2020).*
Tech Audit TV youtube video titled "Secretlab Magnus Metal Desk: A cable management Dream!" dated Jul. 23, 2021, https://www.youtube.com/watch?v=wYitSfDPcqY (Year: 2021).*
Vivo Magnetic Cable Management Channel SKU: DESK-AC01-1MB, date: May 5, 2022 (Year: 2022).*
Extended European Search Report of corresponding EP patent application No. 23178383.8, dated Oct. 30, 2023, 6 pages (for informational purposes only).

* cited by examiner

APPARATUS FOR A DISPLAY DEVICE

TECHNICAL FIELD

The present disclosure relates to an apparatus for a display device, and a method of manufacturing an apparatus for a display device.

BACKGROUND

The following discussion of the background is intended to facilitate an understanding of the present disclosure only. It should be appreciated that the discussion is not an acknowledgement or admission that any of the material referred to was published, known or is part of the common general knowledge of the person skilled in the art in any jurisdiction as of the priority date of the disclosure.

Conventional apparatuses for display devices include a portion for mounting the display device and another portion for fastening the apparatus to a desired surface, such as a table top.

Such apparatuses are often transported in a disassembled configuration and a user has to assemble the apparatus before use. The assembly process can be complex and typically includes multiple steps, which may be troublesome and difficult for a user. In addition, during assembly and the mounting of the apparatus to a table top, a user typically has to over-tighten the portion for fastening the apparatus to the table top for stability. This can cause unwanted damage to the apparatus and/or the table top. Further, the portion for mounting the display device is not adjustable and the user is not able to adjust the display device to a desired position.

Furthermore, accessories such as the display device accessories, e.g. cables, may loosely hang from the display device itself. The loose accessories may get entangled with each other and inconvenience the user. In addition, the loose accessories are not aesthetically appealing.

Accordingly, there exists a need for an improved apparatus for a display device, that seeks to address at least one of the aforementioned issues.

SUMMARY

The disclosure was conceptualized to provide an improved apparatus for a display device, which may be attached to a table assembly. It is contemplated that the apparatus forms a magnetic ecosystem with a table assembly having a magnetic ecosystem, to form an integrated magnetic ecosystem. The magnetic ecosystem enables the provision of a cable management system which allows a user to manage, hide and store accessories, e.g. cables within the apparatus itself. As such, the user does not require additional cable management systems to prevents the accessories from getting entangled with each other and to minimize clutter, which may be aesthetically appealing to the user. Embodiments of the disclosure provides an improved apparatus which is simple and quick to assemble. Further, the fastening assembly of the apparatus allows a user to fasten the apparatus to the table without damaging the table top and at the same time, provides a stable support for the display device. In addition, the apparatus allows a user to easily position the display device at a desired height and orientation, which may alleviate the user's eye, neck, back pain (due to prolonged use of the display device, e.g. "tech neck") and thus improves the health of the user.

The apparatus is particular applicable for supporting liquid crystal displays, e.g. visual display units such as a computer display or screen, but can be used to support other objects, such as a mobile device.

According to one aspect of the disclosure, there is an apparatus for a display device comprising: a fastening assembly mountable to a surface; an adjustment portion having an end configured to receive a display device mount, and an opposing end configured for attachment to the fastening assembly; the adjustment portion comprising at least one hollow portion formed of or from a metallic material for receiving an accessory, and a sheath formed of or from a magnetic material for magnetic coupling with the at least one hollow portion, wherein the sheath is moveable along a longitudinal axis of the adjustment portion.

According to another aspect of the disclosure, there is a kit of parts of an apparatus for a display device comprising: a fastening assembly mountable to a surface; an adjustment portion having an end configured to receive a display device mount, and an opposing end configured for attachment to the fastening assembly; the adjustment portion comprising at least one hollow portion formed of or from a metallic material for receiving an accessory, and a sheath formed of or from a magnetic material for magnetic coupling with the at least one hollow portion, wherein the sheath is moveable along a longitudinal axis of the adjustment portion.

According to another aspect of the disclosure, there is provided a method of manufacturing an apparatus for a display device comprising: providing a fastening assembly mountable to a surface; providing an adjustment portion having an end configured to receive a display device mount, and an opposing end configured for attachment to the fastening assembly; the adjustment portion comprising at least one hollow portion formed of or from a metallic material for receiving an accessory, and providing a sheath formed of or from a magnetic material for magnetic coupling with the at least one hollow portion, wherein the sheath is moveable along a longitudinal axis of the adjustment portion.

BRIEF DESCRIPTION OF THE DRAWINGS

The disclosure will be better understood with reference to the detailed description when considered in conjunction with the non-limiting examples and the accompanying drawings, in which.

DETAILED DESCRIPTION

Figure 1:
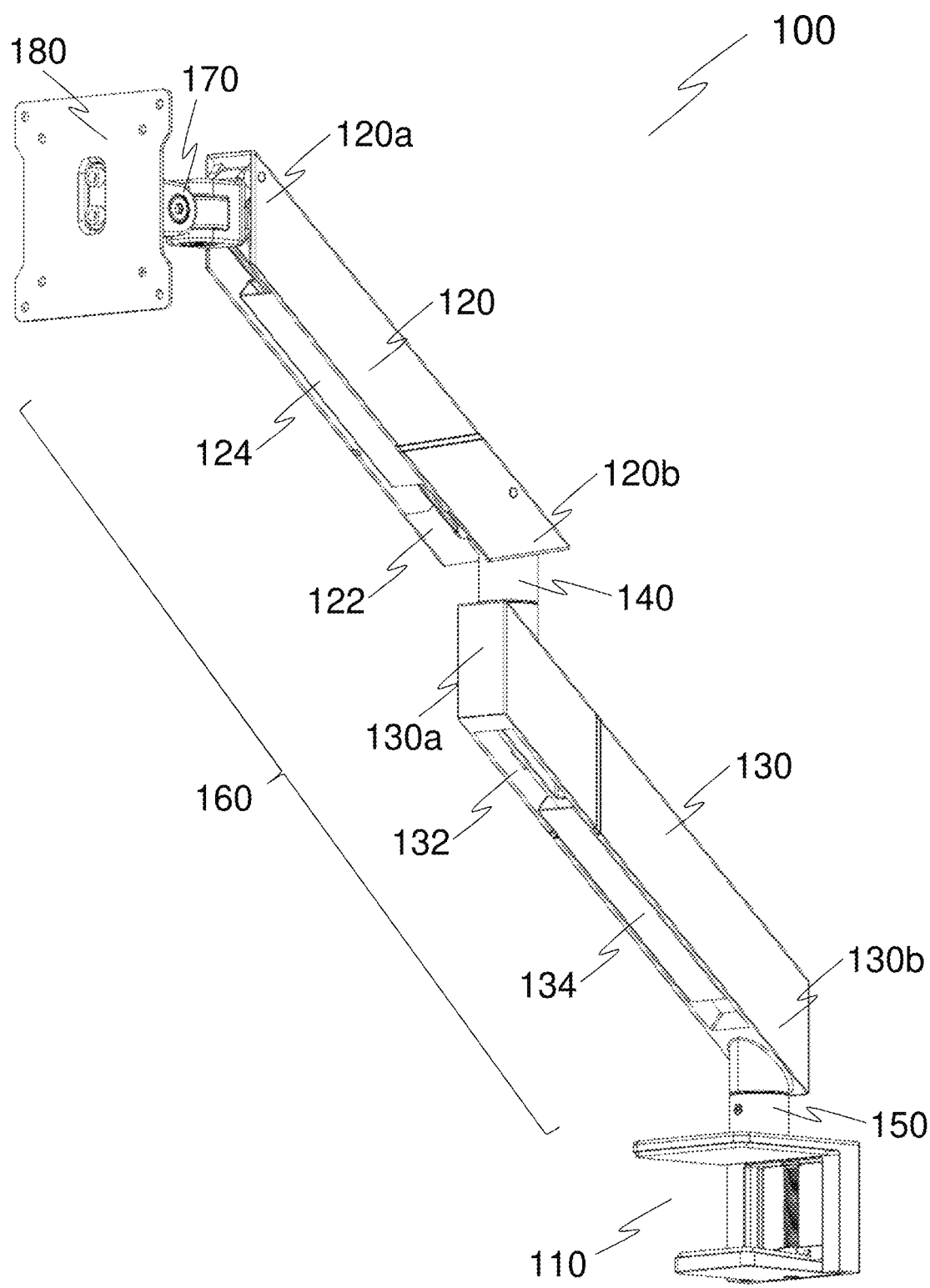
FIG. 1 shows a perspective view of an apparatus 100 for a display device in an assembled configuration.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

The disclosure illustratively described herein may suitably be practiced in the absence of any element or elements, limitation or limitations, not specifically disclosed herein. Thus, for example, the terms "comprising", "including," containing", etc. shall be read expansively and without limitation. The word "comprise" or variations such as "comprises" or "comprising" will accordingly be understood to imply the inclusion of a stated integer or groups of integers but not the exclusion of any other integer or group of integers. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the disclosure. Thus, it should be understood that although the present disclosure has been specifically described in exemplary embodiments and optional features, modification and variation of the disclosure embodied herein may be resorted to by those skilled in the art.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements. As used herein, the term "and/or" includes any and all combinations of one or more of the associated listed items.

While terms such as "first", "second" etc., may be used to describe various elements, such elements are not limited to the above terms. The above terms are used only to distinguish one element from another, and do not define an order and/or significance of the elements. Without departing a scope of rights of the specification, a first element may be referred to as a second element, and similarly, the second element may be referred to as the first element.

Throughout the description, the term "magnetic coupling" refers broadly to an attractive magnetic force between two objects, and may have an associated magnetic strength. In some embodiments, the magnetic coupling may be between at least one hollow portion of the adjustment portion and the sheath.

Figure 2:
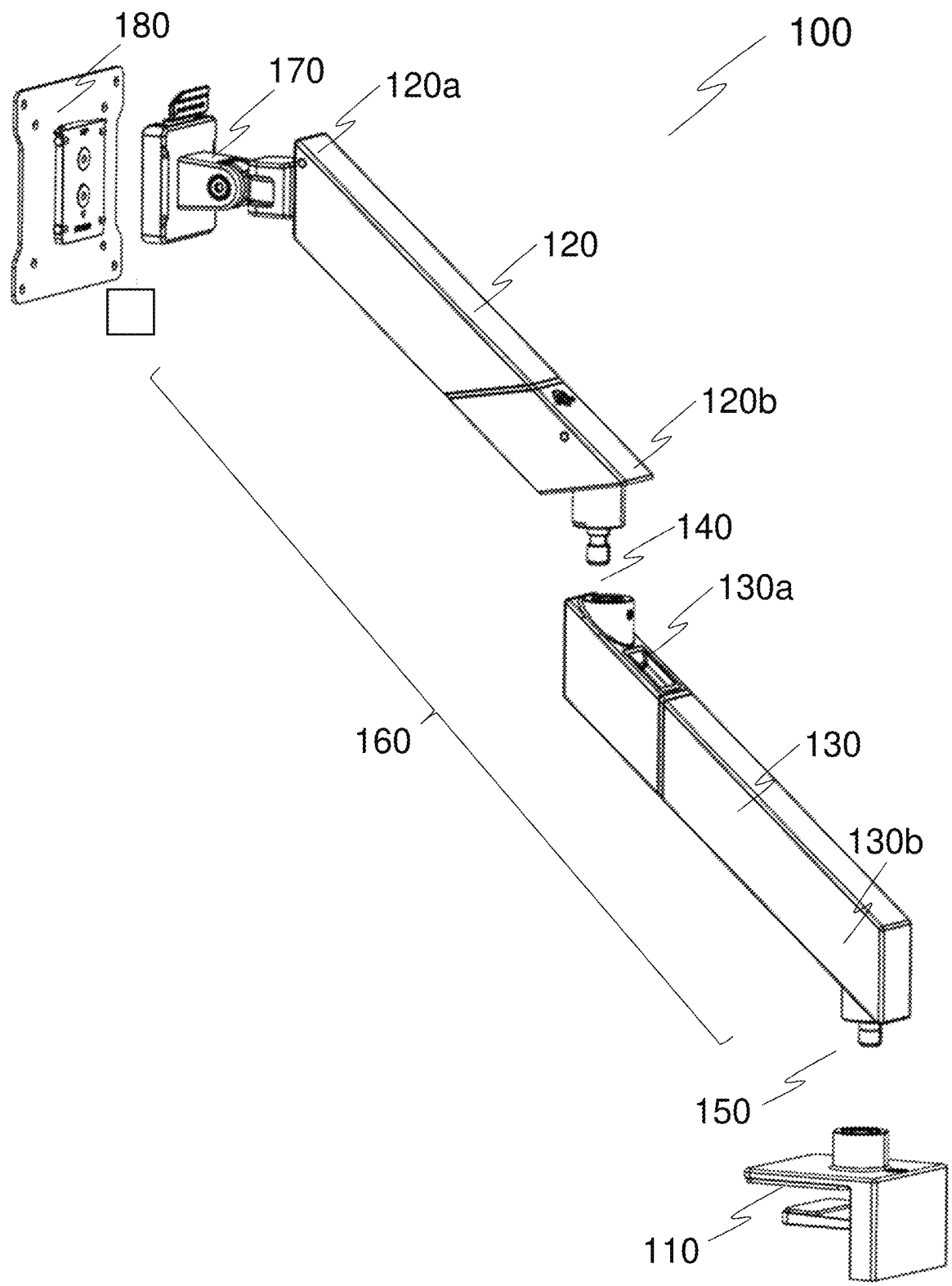
FIG. 2 shows the same perspective view of the apparatus 100 for the display device in a disassembled configuration.

FIG. 1 shows a perspective view of an apparatus 100 for a display device in an assembled configuration. FIG. 2 shows the same perspective view of the apparatus 100 for the display device in a disassembled configuration. Referring to FIGS. 1 and 2, the apparatus 100 includes a fastening assembly 110 mountable to a surface. The surface may be a table top of a table assembly, e.g. a desk top. It is contemplated that the fastening assembly 110 may be mounted to any surface having a thickness for fastening the fastening assembly 110 onto the surface. For example, the surface may have a constant thickness, or may have a variable thickness.

The apparatus 100 includes an adjustment portion 160 having an end 120a configured to receive a display device mount 180, and an opposing end 130b configured for attachment to the fastening assembly 110. The adjustment portion 160 may include a first support arm 120 and a second support arm 130 which may be connected to each other. In some embodiments, the first 120 and second 130 support arms may be connected to each other via a pivotable interface 140. The first support arm 120 may include the end 120a configured to receive the display device mount 180, and an opposing end 120b configured for attachment to the second support arm 130. In some embodiments, the first support arm 120 may include an attachment mechanism 170 configured for attachment to the display device mount 180. The second support arm 130 may include the end 130a configured for attachment to the first support arm 120, and an opposing end 130b configured for attachment to the fastening assembly 110. In some embodiments, the second support arm 130 may be connected to the fastening assembly 110 via a mechanical fastener 150, such as but not limited to threaded screws. This may allow the second support arm 130 to be rotatable relative to the fastening assembly 110.

The adjustment portion 160 includes at least one hollow portion 122, 132 formed of or from a metallic material for receiving an accessory. The metallic material may include but is not limited to iron, aluminum, copper, zinc, titanium, carbon steel, stainless steel, steel or a combination of such materials. As shown in FIGS. 1 and 2, the first 120 and second 130 support arms of the adjustment portion 160 may each include the hollow portion 122, 132. For example, the first support arm 120 may include a first hollow portion 122, and the second support arm 130 may include a second hollow portion 132. Each of the first 122 and second 132 hollow portions may be formed of or from the metallic material, and may be configured to receive the accessory. For example, each of the first 120 and second 130 support arms may be formed having a depression or an empty space, e.g. corresponding to the first 122 and second 132 hollow portions, respectively, that is suitable for receiving and housing the accessory. An opening configured for receiving the accessory may be arranged along the longitudinal axis of each of the first 122 and second 132 hollow portions.

The adjustment portion 160 further includes a sheath 124, 134 formed of or from a magnetic material for magnetic coupling with the at least one hollow portion 122, 132. As shown in FIGS. 1 and 2, the first support arm 120 may include the first sheath 124 suitable for magnetic coupling with the first hollow portion 122, and the second support arm 130 may include the second sheath 134 suitable for magnetic coupling with the second hollow portion 132. The first sheath 124 may be arranged to cover the opening of the first hollow portion 122, and the second sheath 134 may be arranged to cover the opening of the second hollow portion 132. Accordingly, the first 124 and second 134 sheaths may contain the accessory within the first hollow portion 122 and the second hollow portion 132, respectively.

In various embodiments, the sheath 124, 134 may be configured to be removable, e.g. detachable to the at least one hollow portion 122, 132. In use, a user may remove the first sheath 124 from the first hollow portion 122, and/or the second sheath 132 from the second hollow portion 134, to place the accessory within the first 122 and/or second 132 hollow portion. The sheath 124, 134 may be used to cover and contain the accessory within the first 122 and/or second 132 hollow portions. In some embodiments, the accessory may include a non-magnetic material which may not be magnetically coupled to the at least one hollow portion 122, 132. In some embodiments, the accessory may be electrical and/or power lines, e.g. cables, for transmitting electricity and/or telecommunication signals to and/or from the display device. Alternatively, or in addition, the accessory may be formed of or from a magnetic material suitable for magnetic coupling to the at least one hollow portion 122, 132, or to any part of the adjustment portion 160 itself. Examples of such magnetic accessories include, but are not limited to, USB/Audio Hubs, cable snap clips, cable reels, headphone holders, microphones, head phones, speakers, decorative magnetic accessories.

Figure 3:
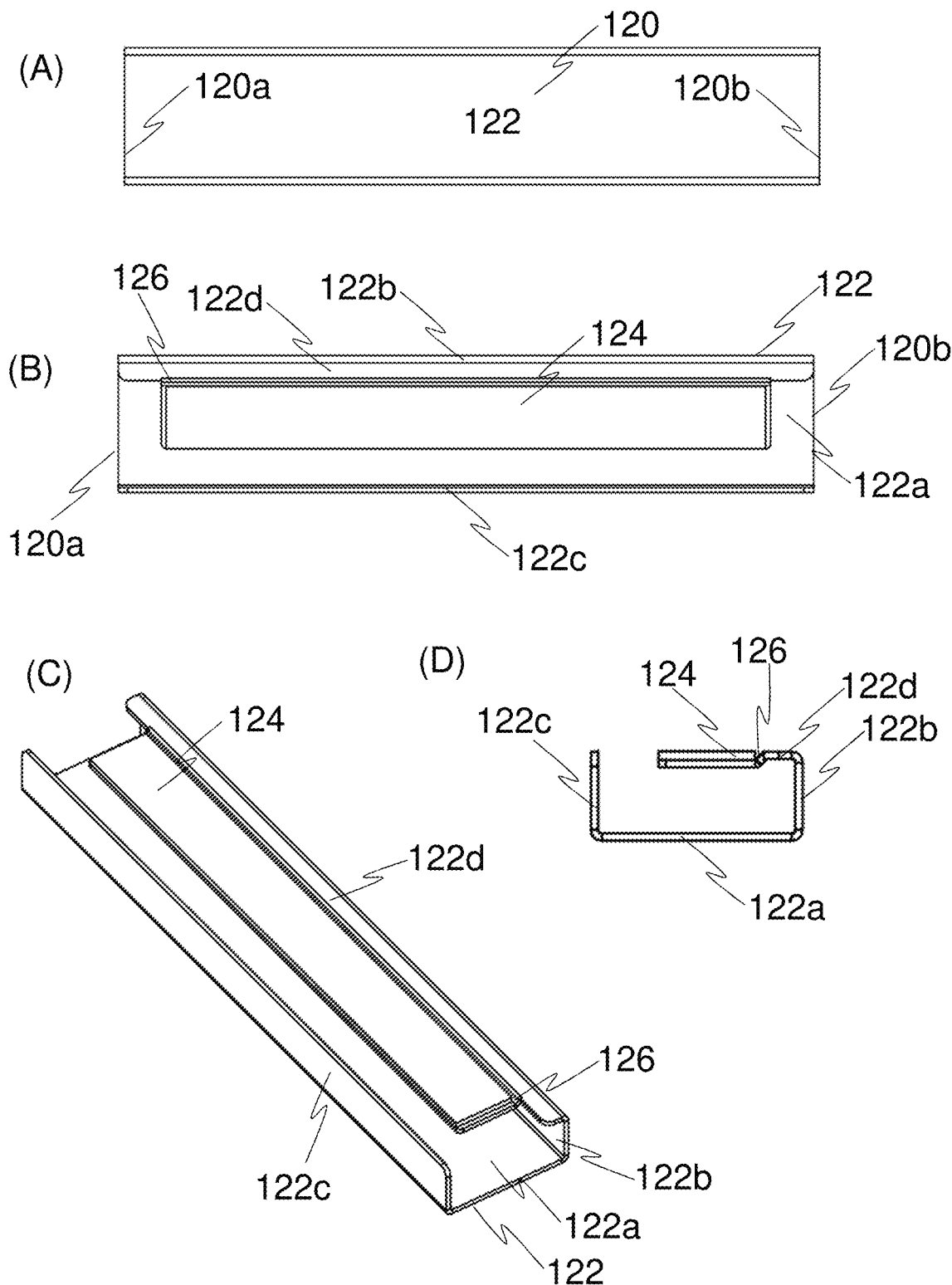
FIG. 3 shows the (A) top view, (B) and (C) the bottom views from different perspectives, and (D) the cross-sectional view, of the coupling between the at least one hollow portion 122, 132, and the sheath 124, 134.

FIG. 3 shows the (A) top view, (B) and (C) the bottom views from different perspectives, and (D) the cross-sectional view, of the coupling between the at least one hollow portion 122, 132, and the sheath 124, 134. The reference numerals provided in FIG. 3 shows an example of the coupling between the first hollow portion 122 and the first sheath 124. However, the disclosure is not limited thereto, and the same may be applicable to the second hollow portion 132 and the second sheath 134. In various embodiments, the first 124 and second 134 sheaths may be identical to each other, and may therefore be interchangeable. Referring to FIGS. 1 to 3, the first sheath 124 may have a first parameter (such as a length) that is less than, i.e. shorter than, the first hollow portion 122. As such, a separation is provided between the end 120a of the first support arm 120 and an end of the first sheath 124, and another separation is provided between the opposing end 120b of the first support arm 120 and the respective opposing end of the first sheath 124. In various embodiments, the first sheath 124 may therefore be moveable along a longitudinal axis of the first support arm 120, and the second sheath 134 may similarly be moveable along a longitudinal axis of the second support arm 130. In other words, the first 124 and second 134 sheaths may be slidable along the opening of the first 122 and second 132 hollow portions, respectively. Accordingly, tension in the cables, which are housed within the adjustment portion 160, may be reduced when the first 120 and/or second 130 support arms are moving, e.g. along/within the lateral or longitudinal plane of the apparatus 100.

In various embodiments, the magnetic material of the sheath 124, 134, may be a ferromagnetic material, such as but not limited to metals including iron, nickel, cobalt and or their alloys. In some embodiments, the magnetic material may be a ferrite, e.g. iron oxide, or a neodymium (NdFeB) magnet. In an embodiment, the magnetic material of the sheath 124, 134 may include a relatively flexible NdFeB magnetic sheet. It is contemplated that other materials may be selected. The aforementioned magnetic materials provide examples of materials selected to provide good coupling strength, and to allow easy removal of the sheath 124, 134, and slidable movement along the longitudinal axis of the first 120 and second 130 support arms, e.g. adjustment portion 160.

Accordingly, the apparatus 100 according to various embodiments of the disclosure may provide a magnetic cable management system which allows a user to easily fit the sheath 124, 134 into openings of the first 122 and second 132 hollow portions, to manage, hide and store cables within the apparatus 100 itself, e.g. the first 122 and second 132 hollow portions. As such, the user does not require additional cable management systems to minimize the accessories from getting entangled with each other and to minimize clutter. This may be aesthetically appealing to the user. In addition, since the sheath 124, 134 is moveable along the longitudinal axis of the adjustment portion 160, a user may easily arrange the sheath 124, 134 at a desired position to accommodate movement, e.g. rotation, tilting of the display device, or to accommodate connections to other circuits, such as but not limited to other microprocessors, display devices, mobile phones, or to power sockets, and simultaneously reducing tension of the cables whenever the adjustment portion 160, e.g. first 120 and/or second 130 support arms are moving.

As shown in FIGS. 3(B) to (D), the first hollow portion 122 may include a central part 122a, a first part 122b, a second part 122c, and a third part 122d. The first 122b and second 122c parts may extend from opposing sides of the first hollow portion 122, and may correspond to the opposing sides of the first support arm 120. In some embodiments, the first 122b and second 122c parts may extend perpendicular to the first hollow portion 122. The third part 122d may extend from at least one of the first 122b or second 122c parts. In some embodiments, the third part 122d may extend perpendicular to at least one of the first 122b or second 122c parts. In the embodiment shown in FIGS. 3(B) to (D), the third part 122d may extend from the second part 122b of the first hollow portion 122. Alternatively, or in addition, at least one of the first 122b, second 122c and/or third parts 122d may extend at an angle.

In various embodiments, the first sheath 124 may be magnetically couplable to the first 122b and second 122c parts. In some embodiments, the third part 122d may also be magnetically couplable to the first sheath 124. Since the first sheath 124 may be positioned at the opening of the first hollow portion 122, adequate space is provided for a user to store accessories within the at least one hollow portion 122, 132 of the apparatus 100.

In various embodiments, a second parameter (such as a width) of the sheath 124, 134, may be equal to or less than a width of the at least one hollow portion 122, 132. This allows the sheath 124, 134 to securely cover the opening of the at least one hollow portion 122, 132, and prevents accessories from falling out of the at least one hollow portion 122, 132.

Referring to the example in FIGS. 3(B) to (D), the first sheath 124 may further include a protrusion 126 arranged along a length of the first sheath 124. The protrusion 126 may be a thin projection on the first sheath 124 to ensure that said protrusion 126 is flushed against/with the sheath 124. In some embodiments, the protrusion 126 may be configured to be magnetically couplable to the third part 122d of the first hollow portion 122. In use, the protrusion 126 may provide an integral attachment feature, e.g. snap-fit feature, to fasten and hook the protrusion 126 of the first sheath 124 to the third part 122d of the first hollow portion 122. As such, the sheath 124, 134 may be securely attached to the at least one hollow portion 122, 132, and at the same time, allow the user to easily remove or attach the sheath 124, 134 to the at least one hollow portion 122, 132.

Figure 4:
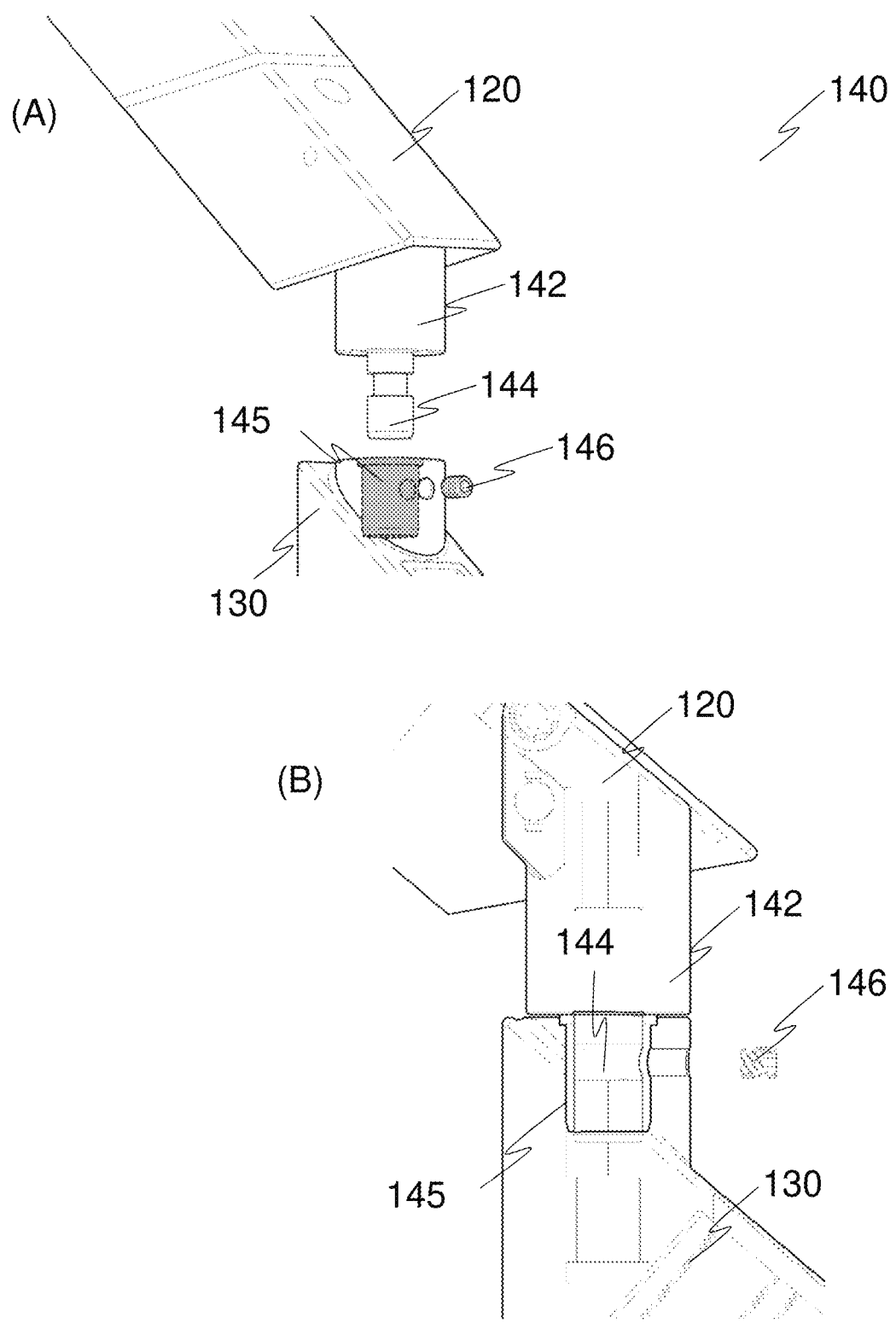
FIG. 4 shows the cross-sectional view of the pivotable interface 140 in the (A) disassembled, and (B) partially assembled configurations

FIG. 4 shows the cross-sectional view of the pivotable interface 140 in the (A) disassembled, and (B) partially assembled configurations. Referring to FIGS. 4(A) and (B), the first 120 and second 130 support arms may be joined to each other at the pivotable interface 140. The pivotable interface 140 may include a shaft 142 extending from an end 120*b* of the first support arm 120, and a first screw 144 extending from the shaft 142. The pivotable interface 140 may further include a sleeve 145 which may be housed in a holder, arranged at an end 130*a* of the second support arm 130 and configured to receive the first screw 144. During assembly, the user may attach the first screw 144 of the first support arm 120 to the sleeve 145 of the second support arm 130, and may secure the attachment with a second screw 146. For example, the second screw 146 may be tightened to increase the rotational resistance of the first screw 144 and the shaft 142. In various embodiments, the first screw 144 cooperates with the sleeve 145 such that the first support arm 120 may move along a lateral plane, e.g. horizontal plane, x-axis. In some embodiments, the first support arm 120 may further include a spring mechanism to facilitate the movement of the first support arm 120 along a longitudinal plane, e.g. vertical plane, y-axis, of the apparatus 100. For example, the first support arm 120 may be configured to traverse a range between 250 mm to 350 mm, preferably between 290 mm to 300 mm along the longitudinal plane. In an embodiment, the first support arm 120 may have a minimum height ranging between 130 mm to 180 mm, and a maximum height ranging between 400 mm to 500 mm. In some embodiments, the pivotable interface 140 may be further configured such that the first support arm 120 may be rotatable, e.g. with a range of 360° relative to the second support arm 130, e.g. about the pivotable interface 140.

In some embodiments, the first support arm 120 may be positioned such that an angle between the end 120*b* of the first support arm 120 and the second support arm 130 may be an obtuse angle, as shown in the exemplary embodiments of FIGS. 1, 2 and 4. This may provide a position which may be at the eye level of a user, e.g. adult of average height to minimize eye, neck and/or back strain, and thus improve the user experience and overall health of the user.

Figure 5:
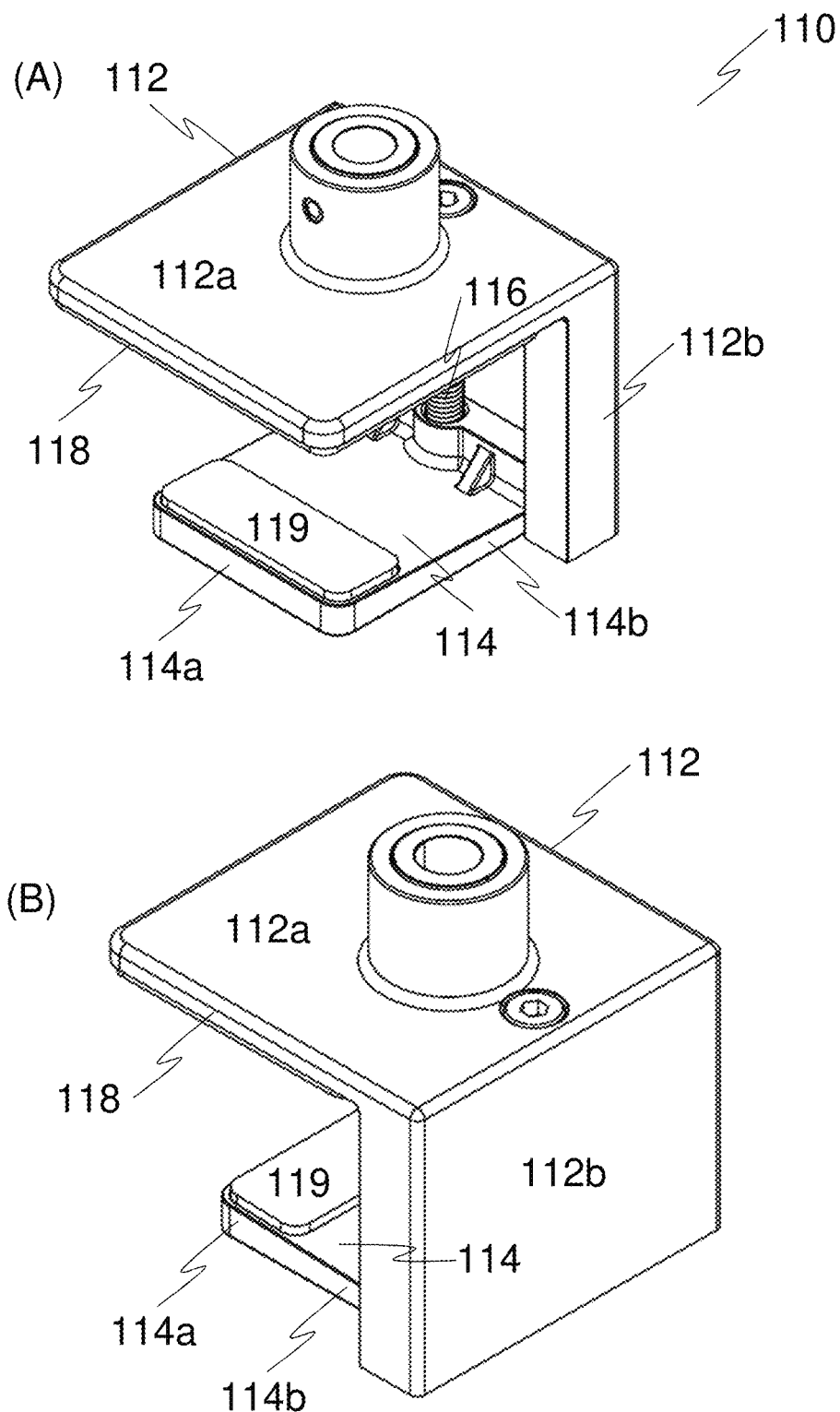
FIG. 5 shows the (A) front-side view, (B) back-side view, (C) front view, and (D) side view of the fastening assembly 110.
Figure 5:
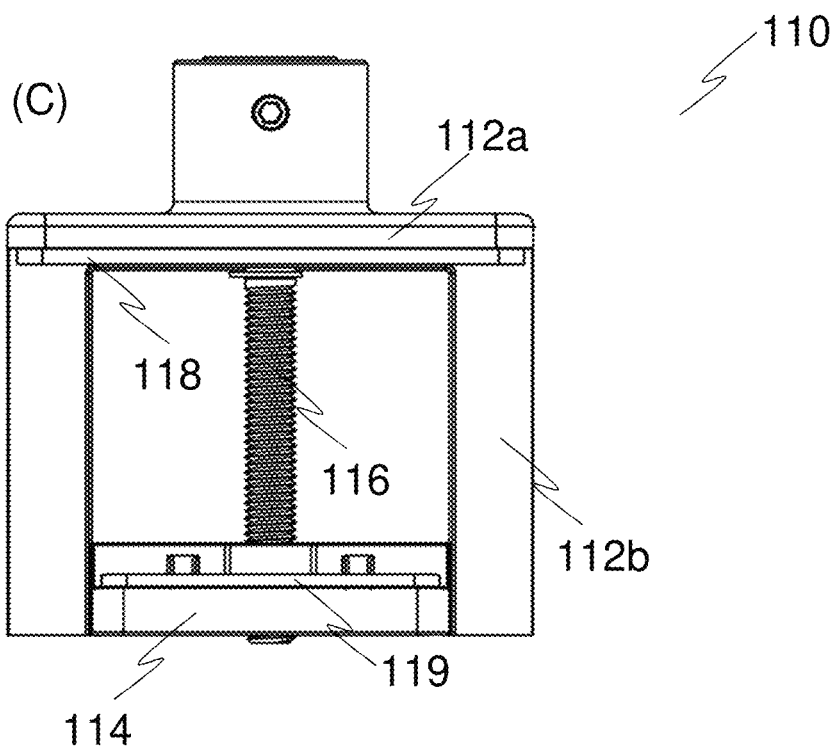
Figure 5:
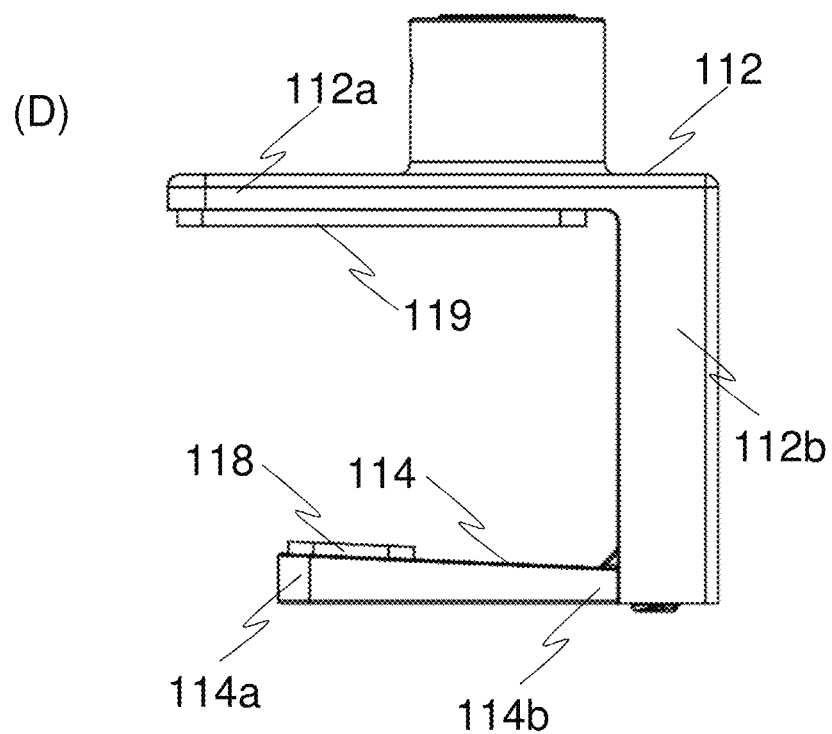

FIG. 5 shows the (A) front-side view, (B) back-side view, (C) front view, and (D) side view of the fastening assembly 110. The fastening assembly 110 may include a first base plate 112 having a first section 112*a* and a second section 112*b* extending from the first section 112*a*. The second section 112*b* may extend perpendicular to the first section 112*a*. Alternatively, the second section 112*b* may extend at an angle to the first section 112*a*. The fastening assembly 110 also includes a second base plate 114 arranged opposite the first section 112*a*, and a rotatable shaft 116 arranged between the first section 112*a* and the second base plate 114. For example, the second section 112*b* may be parallel to the rotatable shaft 116. In various embodiments, a rotation of the rotatable shaft 116 may cause a translation of the second base plate 114 towards or away from the first section 112*a*. In other words, the rotatable shaft 116 is configured to move the second base plate 114 upwards, e.g. towards the first section 112*a*, to fasten, e.g. clamp the apparatus 100 onto a surface, and to move the second base plate 114 downwards, e.g. away from the first section 112*a*, to release the apparatus 100 from the surface.

As shown in FIGS. 5(A), (B) and (D), the second base plate 114 has a thickness which tapers from an end 114*a* of the second base plate 114 to an opposing end 114*b* of the second base plate 114. In an embodiment, the end 114*a* may have a greater thickness than the opposing end 114*b* of the second base plate 114. In other words, the second base plate 114 may be wedge-shaped. In some embodiments, the second base plate 114 may be positioned at an angle relative to the second section 112*b* of the first base plate 112. The angle may be an acute angle, and may have a range between 80° to 89°, preferably 87.5°. In these embodiments, the second base plate 114 may not perpendicular to the second section 112*b*. This may reduce flex and increase mounting stability when the fastening assembly 110 is fastened onto the surface.

Figure 6:
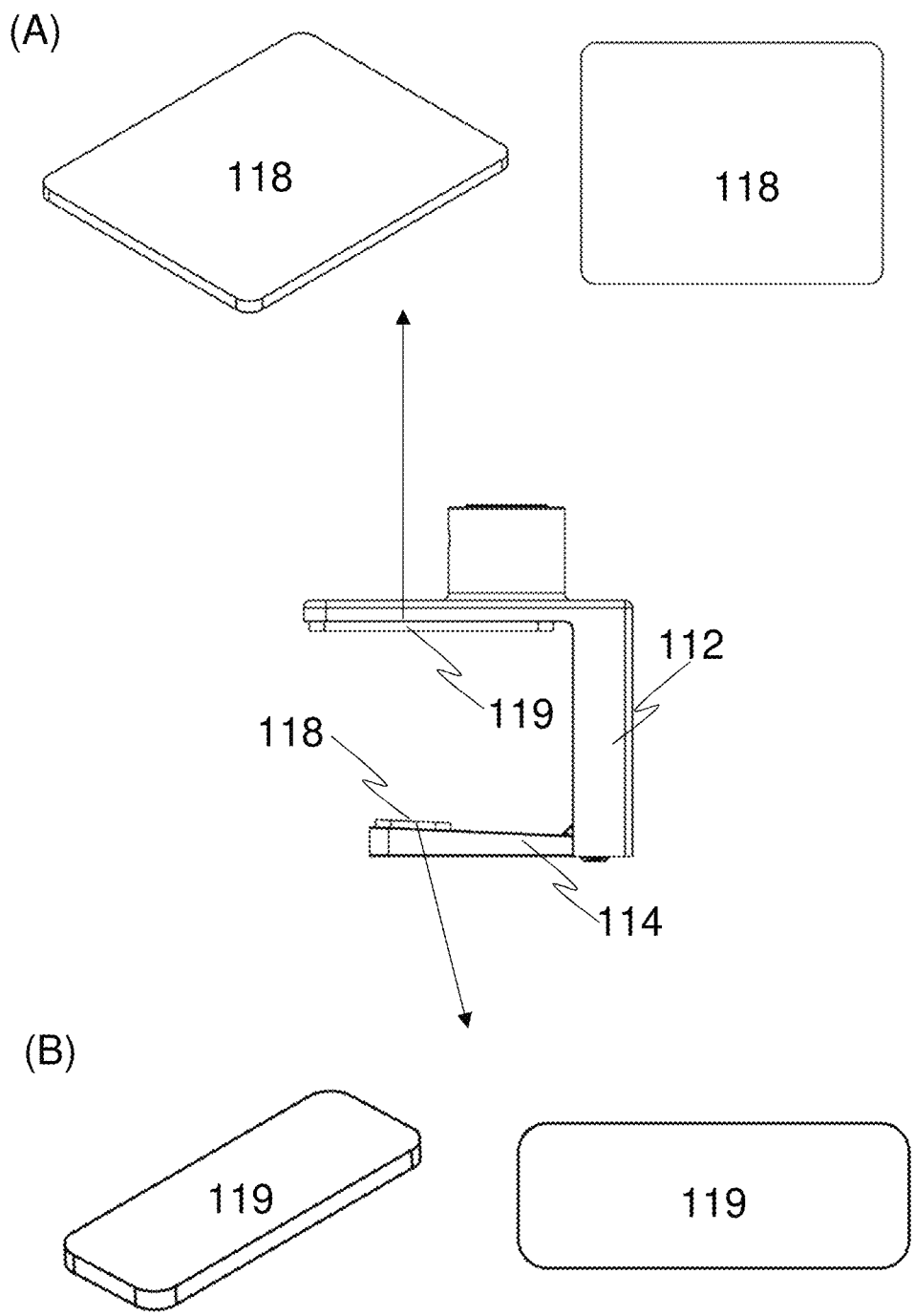
FIG. 6 shows the resilient material layered on a surface of the (A) first section 112a of the first base plate 112, and (B) second base plate 114.

FIG. 6 shows the resilient material layered on a surface of the (A) first section 112*a* of the first base plate 112, and (B) second base plate 114. The fastening assembly 110 may further include a resilient material 118, 119 layered on a surface of at least one of the first base plate 112 or the second base plate 114. In some embodiments, the resilient material 118 may be arranged on a surface of the first section 112*a*, and may be the surface which faces the second base plate 114. In some other embodiments, the resilient material 119 may be arranged on a surface of the second base plate 114 which faces the surface of the first section 114*a* in which the second base plate 114 translates towards or away from. In an embodiment, the resilient materials 118, 119 are arranged on a surface of both the first 112 and second 114 base plates, and may be in contact with the surface to which is fastening assembly 110 is fastened onto.

The properties of the resilient material may be controlled to resist deformation, e.g. compression, without compromising the stability of the fastening assembly 110. In some embodiments, the resilient material may include polyethylene (PE) polymers with varying densities and/or molecular weights, and may have a shore hardness (A scale) in the range of 50 to 100 A, preferably between 65 to 75 A. The resilient material 118, 119 may thus protect the surface onto which the fastening assembly 110 is fastened onto without compromising the stability of the fastening assembly 110 and apparatus 100 itself. It is contemplated that the resilient material 118, 119 may be useful in fastening the apparatus 100 onto a surface with variable thickness.

Figure 7:
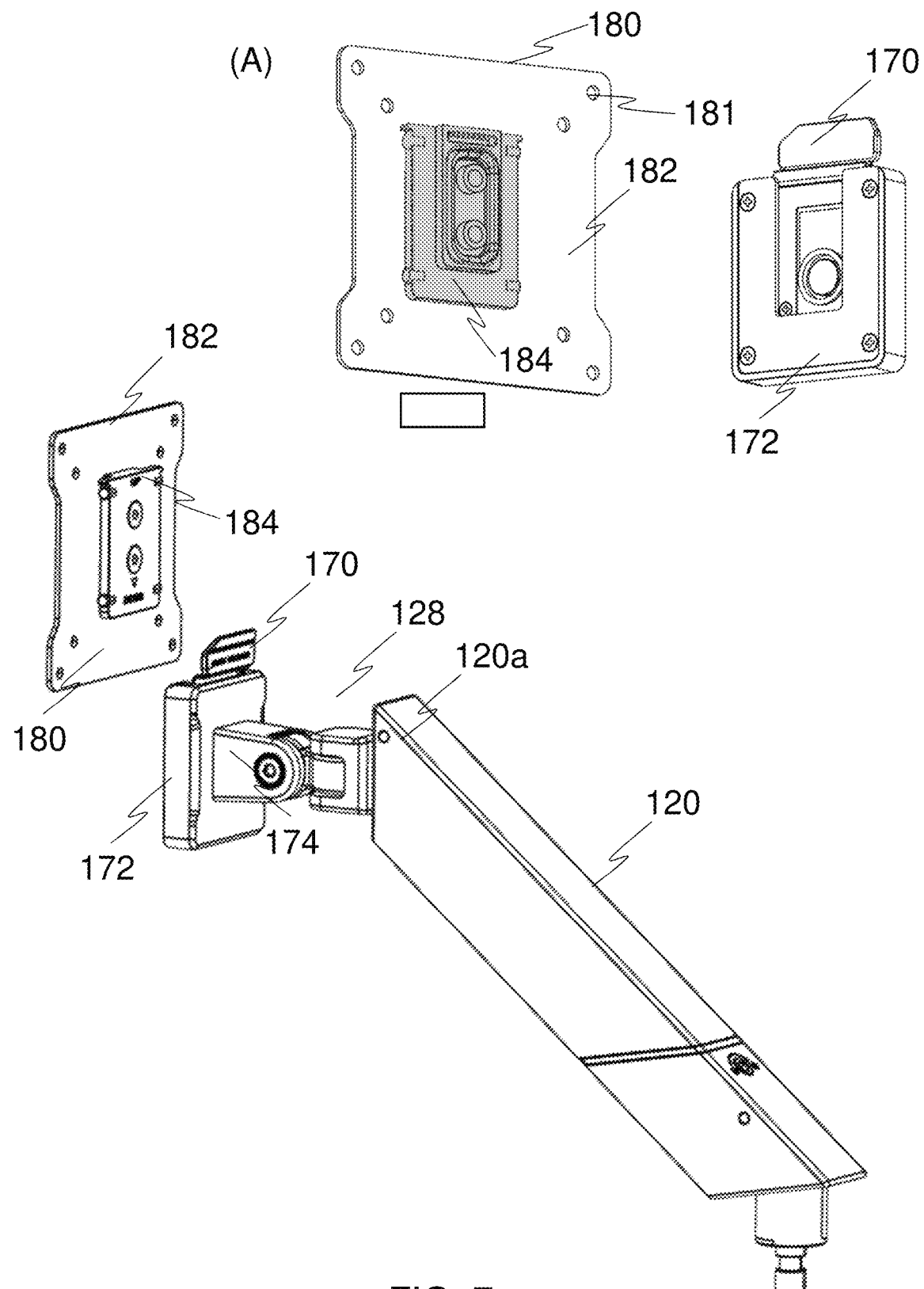
FIG. 7 shows a perspective view of the attachment assembly 170 and the display device mount 180, and inset (A) shows an exploded view of the same.

FIG. 7 shows a perspective view of the attachment assembly 170 and the display device mount 180, and inset (A) shows an exploded view of the same. The attachment assembly 170 may include a housing 172 and a contact plate 174 extending from the housing 172. The contact plate 174 may be configured for attachment to a connection means 128 positioned at an end 120*a* of the first support arm 120. In some embodiments, the contact plate 174 may be rotatable and may be configured to rotate 360° relative to the first support arm 120 of the adjustment portion 160, allowing the user to easily orientate a mounted display device in a desired orientation.

The display device mount 180 may include a mounting plate 182 including a plurality of mounting screws holes 181 for attaching the display device onto the display device mount 180, and a bracket 184 extending from a surface of the mounting plate 180. In some embodiments, the display device mount 180 may include standard VESA mounts known to those skilled in the art, and a user screws the display device onto the mounting plate 182 via the plurality of mounting screw holes 181. In various embodiments, the housing 172 of the attachment mechanism 170 may be configured to receive the bracket 184, and during assembly, a user may slot the bracket 184 into the housing 172. This provides a quick and easy, e.g. 1-step installation method.

Another aspect of the disclosure further relates to a kit of parts of an apparatus for a display device including: a fastening assembly mountable to a surface; an adjustment portion having an end configured to receive a display device mount, and an opposing end configured for attachment to the fastening assembly; the adjustment portion comprising at least one hollow portion formed of or from a metallic material for receiving an accessory, and a sheath formed of or from a magnetic material for magnetic coupling with the at least one hollow portion, wherein the sheath is moveable along a longitudinal axis of the adjustment portion. The apparatus may refer to the apparatus 100 described with reference to FIGS. 1 to 7 and repeated descriptions will be omitted.

Figure 8:
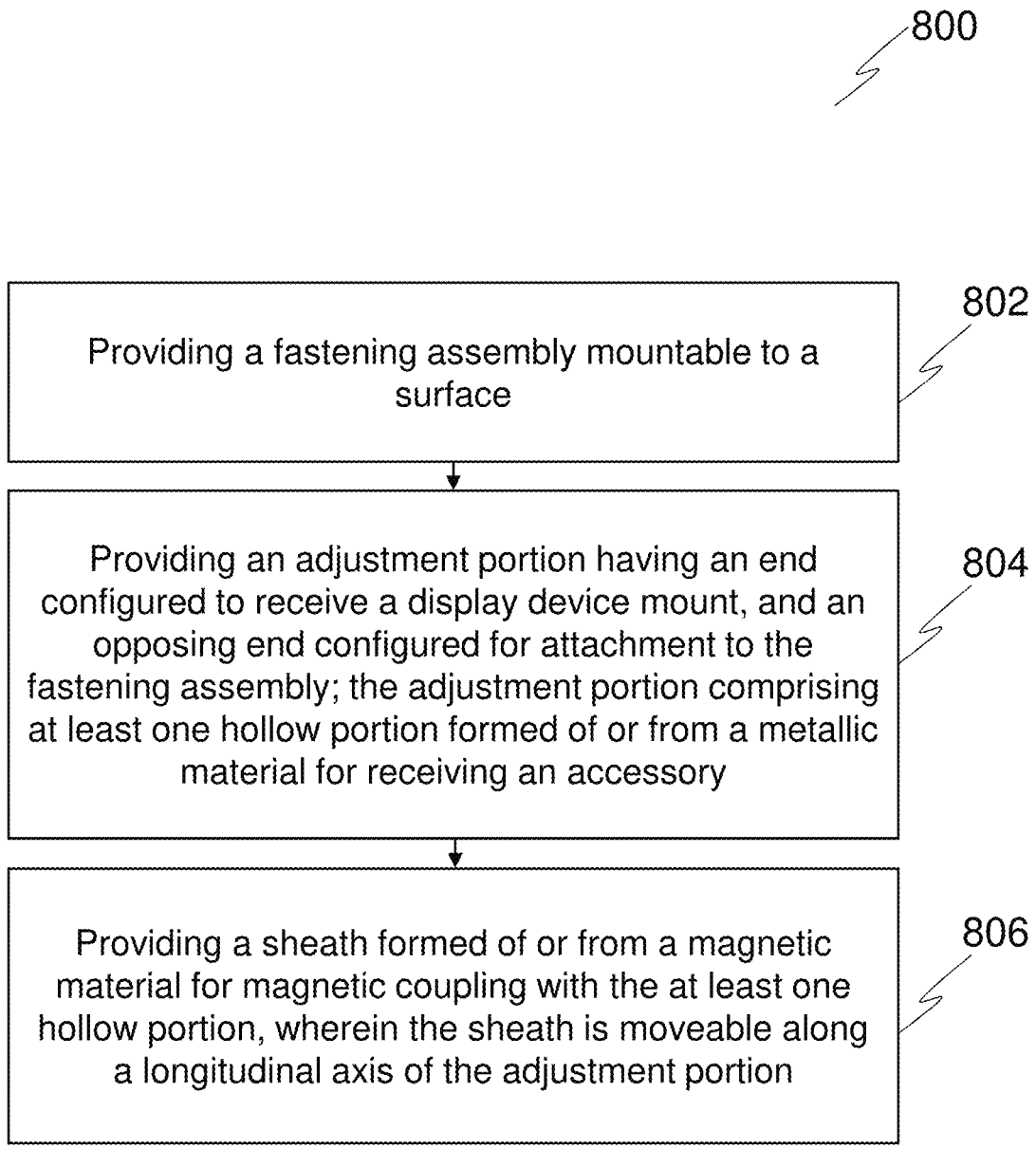
FIG. 8 shows a method 800 of manufacturing an apparatus for a display device, in accordance with yet another aspect of the disclosure.

FIG. 8 shows a method 800 of manufacturing an apparatus for a display device, in accordance with yet another aspect of the disclosure. Method 800 includes: providing a fastening assembly mountable to a surface (step 802); providing an adjustment portion having an end configured to receive a display device mount, and an opposing end configured for attachment to the fastening assembly, the adjustment portion comprising at least one hollow portion formed of or from a metallic material for receiving an accessory (step 804), and providing a sheath formed of or from a magnetic material for magnetic coupling with the at least one hollow portion, wherein the sheath is moveable along a longitudinal axis of the adjustment portion (step 806). The method 800 of manufacture of the apparatus may refer to the apparatus 100 described with reference to FIGS. 1 to 7 and repeated descriptions will be omitted.

Various embodiments of the disclosure thus provide an improved apparatus for a display device, which may support a display device having a weight of up to 10 kg. The improved apparatus includes a magnetic cable management ecosystem that allows a user to easily manage, hide and store accessories within the apparatus itself, avoiding the need for external cable management systems. This reduces clutter and minimizes the accessories from getting entangled with each other, which may be aesthetically appealing. In addition, the fastening assembly provides a straightforward fastening method for assembling the apparatus onto a desired surface, and in particular, provides greater stability without damaging the surface. The adjustment portion and attachment mechanism further allow the user to position the display device a desired position and/or orientation, which may alleviate the user's eye, neck, back pain and improve the user's health.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. An apparatus for a display device comprising
a fastening assembly mountable to a surface;
an adjustment portion having an end configured to receive a display device mount, and an opposing end configured for attachment to the fastening assembly;
the adjustment portion comprising at least one hollow portion formed of or from a metallic material for receiving an accessory; and
a sheath formed of or from a magnetic material for magnetic coupling with the at least one hollow portion, wherein the sheath is moveable along a longitudinal axis of the adjustment portion,
wherein the sheath comprises a cover of an opening of the at least one hollow portion, wherein the sheath is moveable along the opening of the at least one hollow portion in the longitudinal axis of the adjustment portion.

2. The apparatus of claim 1, wherein the magnetic material of the sheath comprises at least one of a metal alloy, a ferrite, a neodymium magnet.

3. The apparatus of claim 1, wherein a length of the sheath is less than a length of the at least one hollow portion, and wherein a width of the sheath is equal to or less than a width of the at least one hollow portion.

4. The apparatus of claim 1, wherein the at least one hollow portion comprises a central part, a first part, a second part and a third part, the first and second parts extending from opposite sides of the central part and the third part extending from at least one of the first part or the second part,
wherein at least one of the first part, the second part and the third part are magnetically couplable to the sheath.

5. The apparatus of claim 4, wherein the sheath further comprises a protrusion arranged along a length of the sheath, the protrusion configured to be magnetically couplable to the third part of the at least one hollow portion.

6. The apparatus of claim 4, wherein the first and second parts of the at least one hollow portion extends perpendicularly from opposite sides of the central part,
wherein the third part of the at least one hollow portion extend perpendicular to the at least one of the first part of the second part of the at least one hollow portion.

7. The apparatus of claim 1, wherein the adjustment portion comprises a first support arm and a second support arm, wherein a first end of the first support arm and a second end of the second support arm are joined to each other at a pivotable interface.

8. The apparatus of claim 7, wherein the first support arm comprises a first hollow portion formed of or from the metallic material for receiving the accessory, and a first sheath formed of or from the magnetic material for magnetic coupling with the first hollow portion, wherein the first sheath is moveable along the longitudinal axis of the first support arm, and
wherein the second support arm comprises a second hollow portion formed of or from the metallic material from receiving the accessory, and a second sheath formed of or from the magnetic material for magnetic coupling with the second hollow portion, wherein the second sheath is moveable along the longitudinal axis of the second support arm.

9. The apparatus of claim 7, wherein an angle between the end of the first support arm and the end of the second support arm joined to each other at the pivotable interface comprises an obtuse angle.

10. The apparatus of claim 7, wherein at least one of the first or second support arms is configured to move along a lateral plane, and a longitudinal plane of the apparatus.

11. The apparatus of claim 1, wherein the fastening assembly comprises
a first base plate, the first base plate having a first section and a second section extending from the first section;
a second base plate, the second base plate arranged opposite the first section;
a rotatable shaft, the rotatable shaft positioned between the first and second base plates;
wherein a rotation of the rotatable shaft is configured to cause a translation of the second base plate towards or away from the first section; and wherein the second base plate has a thickness which tapers from an end of the second base plate to an opposing end of the second base plate.

12. The apparatus of claim 11, wherein the second base plate is positioned at an acute angle relative to the second section of the first base plate.

13. The apparatus of claim 11, further comprising a resilient material layered on at least one surfaces of at least one of the first base plate or the second base plate.

14. The apparatus of claim 1, further comprising
an attachment mechanism configured to attach the display device mount to the end of the adjustment portion,
wherein the attachment mechanism is configured to rotate 360° relative to the adjustment portion.

15. A kit of parts of an apparatus for a display device comprising
a fastening assembly mountable to a surface;
an adjustment portion having an end configured to receive a display device mount, and an opposing end configured for attachment to the fastening assembly;
the adjustment portion comprising at least one hollow portion formed of or from a metallic material for receiving an accessory; and
a sheath formed of or from a magnetic material for magnetic coupling with the at least one hollow portion, wherein the sheath is moveable along a longitudinal axis of the adjustment portion,
wherein the sheath comprises a cover of an opening of the at least one hollow portion, wherein the sheath is moveable along the opening of the at least one hollow portion in the longitudinal axis of the adjustment portion.

16. A method of manufacturing an apparatus for a display device comprising
providing a fastening assembly mountable to a surface;
providing an adjustment portion having an end configured to receive a display device mount, and an opposing end configured for attachment to the fastening assembly;
the adjustment portion comprising at least one hollow portion formed of or from a metallic material for receiving an accessory; and
providing a sheath formed of or from a magnetic material for magnetic coupling with the at least one hollow portion, wherein the sheath is moveable along a longitudinal axis of the adjustment portion,
wherein the sheath comprises a cover of an opening of the at least one hollow portion, wherein the sheath is moveable along the opening of the at least one hollow portion in the longitudinal axis of the adjustment portion.

17. The apparatus of claim 1, wherein the sheath is only slidable within the opening of the at least one hollow portion in the longitudinal axis of the adjustment portion.

18. The apparatus of claim 5, wherein the protrusion comprises a further attachment feature.

19. The kit of parts of the apparatus for the display device of claim 15, wherein the sheath is only slidable within the opening of the at least one hollow portion in the longitudinal axis of the adjustment portion.

20. The method of manufacturing the apparatus for the display device of claim 16, wherein the sheath is only slidable within the opening of the at least one hollow portion in the longitudinal axis of the adjustment portion.

* * * * *